(12) United States Patent
Koppi et al.

(10) Patent No.: US 10,221,820 B2
(45) Date of Patent: Mar. 5, 2019

(54) FUEL SUPPLY SYSTEM AND FUEL FILTER

(71) Applicant: Mahle International GmbH, Stuttgart (DE)

(72) Inventors: Peter Koppi, Sankt Margarethen (AT); Maria Kraut, St. Michael (AT); Hans-Peter Lang, St. Michael/Bleiburg (AT)

(73) Assignee: Mahle International GmbH (DE)

( * ) Notice: Subject to any disclaimer, the term of this patent is extended or adjusted under 35 U.S.C. 154(b) by 261 days.

(21) Appl. No.: 15/023,327

(22) PCT Filed: Sep. 10, 2014

(86) PCT No.: PCT/EP2014/069271
§ 371 (c)(1),
(2) Date: Mar. 18, 2016

(87) PCT Pub. No.: WO2015/039937
PCT Pub. Date: Mar. 26, 2015

(65) Prior Publication Data
US 2016/0222932 A1 Aug. 4, 2016

(30) Foreign Application Priority Data
Sep. 20, 2013 (DE) .................. 10 2013 218 889

(51) Int. Cl.
*F02M 37/22* (2006.01)
*B01D 17/06* (2006.01)
(Continued)

(52) U.S. Cl.
CPC ......... *F02M 37/221* (2013.01); *B01D 17/045* (2013.01); *B01D 17/06* (2013.01);
(Continued)

(58) Field of Classification Search
CPC ...... B01D 17/06; B01D 17/045; C10G 33/02; F02M 37/221
See application file for complete search history.

(56) References Cited

U.S. PATENT DOCUMENTS 3,297,161 A 1/1967 Kasten
3,567,619 A * 3/1971 Brown ................ B01D 17/045
204/665

(Continued)

FOREIGN PATENT DOCUMENTS

DE 878044 C 5/1953
DE 899644 C 12/1953
(Continued)

OTHER PUBLICATIONS

English abstract for DE202011000866.

*Primary Examiner* — Bryan D. Ripa
(74) *Attorney, Agent, or Firm* — Fishman Stewart PLLC

(57) ABSTRACT

A fuel supply system for an internal combustion engine may include a water separator configured to separate a polar phase, for example water, out of fuel. The water separator may be arranged at least one of on and in a fuel supply system component. The water separator may be configured as an electric coalescer. The electric coalescer may have at least two electrodes that are insulated from the fuel.

20 Claims, 1 Drawing Sheet

(51) Int. Cl.
 *B03C 11/00* (2006.01)
 *B01D 17/04* (2006.01)
(52) U.S. Cl.
 CPC .......... *B03C 11/00* (2013.01); *B03C 2201/02* (2013.01); *B03C 2201/30* (2013.01)

(56) References Cited

U.S. PATENT DOCUMENTS

| | | | | |
|---|---|---|---|---|
| 3,577,336 | A | * | 5/1971 | Shirley .............. B01D 17/0202 204/665 |
| 3,697,411 | A | * | 10/1972 | Blomgren et al. ..... B01D 17/06 204/660 |
| 3,839,176 | A | * | 10/1974 | McCoy ................ B01D 17/047 204/560 |
| 4,373,494 | A | * | 2/1983 | McMahon ............. F02M 27/04 123/537 |
| 4,488,970 | A | * | 12/1984 | Clark .................. B01D 17/0214 210/114 |
| 4,512,882 | A | | 4/1985 | Fischer et al. |
| 2007/0186877 | A1 | | 8/2007 | Schulz |
| 2009/0173684 | A1 | | 7/2009 | Tryti et al. |
| 2010/0154727 | A1 | * | 6/2010 | Malgorn ............ B01D 17/0202 123/2 |
| 2011/0303543 | A1 | * | 12/2011 | Fritze ..................... B01D 35/06 204/554 |
| 2013/0327699 | A1 | | 12/2013 | Gaenswein et al. |

FOREIGN PATENT DOCUMENTS

| | | |
|---|---|---|
| DE | 102004011282 A1 | 9/2005 |
| DE | 202011000866 U1 | 6/2011 |
| DE | 102010062813 A1 | 6/2012 |
| GB | 2143157 A | 2/1985 |
| GB | 2377397 A | 1/2003 |

* cited by examiner

FUEL SUPPLY SYSTEM AND FUEL FILTER

CROSS-REFERENCE TO RELATED APPLICATIONS

This application claims priority to German Patent Application No. 10 2013 218 889.7, filed Sep. 20, 2013, and International Patent Application No. PCT/EP2014/069271, filed Sep. 10, 2014, both of which are hereby incorporated by reference in their entirety.

TECHNICAL FIELD

The present invention relates to a fuel supply system. The invention also relates to a fuel filter device.

BACKGROUND

In modern fuel supply systems, water separators are normally used in the associated fuel filter devices to reduce a water fraction in the fuel as much as possible. If the water in the fuel is not separated out, undesirable corrosion, abrasion, material embrittlement and cavitation can result in the assemblies downstream. An elevated water fraction in the fuel supply system likewise promotes the growth of micro-organisms, which can cause slime formation in the fuel filter device and increased corrosion of the filter housing. What are known as coalescers are normally used as water separators, which coalesce the extremely small water fractions to form larger water droplets and separate these out of the fuel-water emulsion using gravity. If necessary for the water separation, what is known as a final separator, consisting of a hydrophobic fabric, can also filter out the water droplets in the fuel-water emulsion. The water separated out in this manner is then collected in separate water collection spaces, from which it is drained periodically or at the latest when the filter element is changed.

DE 10 2010 062 813 A1 discloses a filter device for an internal combustion engine of a motor vehicle, in particular a fuel or lubricant filter, having a filter housing and an annular filter element, which is arranged in the filter housing and through which flow passes in a radial direction from an untreated side to a clean side. A water separator is arranged on the clean side of the filter element and below same, said water separator having a hydrophobic, annular membrane, through which fuel/lubricant can pass radially inwards from the radial outside and which extends in the axial direction of the filter element. This is intended to improve the level of water separation. This is a classical coalescer.

The disadvantages of the water separators known from the prior art are that they only have a limited service life, performance sometimes decreases considerably towards the end of the service life, and therefore they should periodically be changed, for example.

SUMMARY

The present invention is concerned with the problem of specifying an improved embodiment for a fuel supply system and a fuel filter device that in particular achieves good separation values and no longer requires replacement of the water separator.

This problem is solved according to the invention by the subject matter of the independent claims. Advantageous embodiments form the subject matter of the dependent claims.

The present invention is based on the general concept of using a water separator in the form of an electric coalescer in a fuel supply system for an internal combustion engine, in order to separate a polar phase, in particular water, out of the fuel, said water separator being arranged on or in a component of the fuel supply system. Said component can be for example in the form of a main tank, pre-filter, additional tank, fuel line or main filter. Even this non-exhaustive list does not show how flexibly the electric coalescer can be used in the region of the fuel supply system. In comparison with a conventional coalescer with corresponding coalescer materials, this type of coalescer is subject to less wear and as a result can be used for the entire service life of the fuel supply system. In particular, the maintenance outlay for such a fuel supply system can be considerably reduced thereby. In addition, an electric coalescer has less sensitivity to the composition of the fuel, other additives and water, without impairing separation performance. Furthermore, such a water separator in the form of an electric coalescer makes it possible to influence specific parameters of the separation process, in particular droplet movement.

A water-in-fuel emulsion is produced by the dispersal of water in fuel. This is a binary system, the essential feature of which is the formation of a miscibility gap, which extends over virtually the entire concentration range. Owing to the thermodynamic instability of the system, the system tries to assume a state of minimum energy. The separation of the two phases is thus accelerated until there is ultimately complete separation of the phases. To intensify the demulsification process for a water-in-fuel emulsion, the advantageous effect of the presence of an electric field is used. The process of droplet coalescence is formed by the polarising effect of the applied electric field. The forces occurring in the electric field effect an increase in the mobility of the water droplets, which results in a higher collision rate, which in turn has a positive effect on droplet coalescence. The droplets thus combine to form larger droplets and flow together. If the droplets are large enough, gravity prevails and the water phase, having greater specific gravity, sinks.

In a further advantageous embodiment of the solution according to the invention, the electric coalescer has a DC input voltage of 0-5000 V, a pulsed DC voltage of 0-5000 V with a frequency of 0-10,000 Hz or an AC input voltage of 0-40,000 V with a frequency of 0-10,000 Hz. The type of voltage with which the water separator according to the invention, i.e. the electric coalescer, is operated can therefore be selected freely, depending on the desired level of separation and the available voltage supply. For instance, pulsed direct current or alternating current is particularly suitable for water separation if there is a tendency for the water droplets to form chains in the case of large amounts of water.

The present invention is also based on the general concept of using an electric coalescer as the water separator in a fuel filter device instead of previously customary water separators with corresponding coalescer materials, since the present type of coalescer is subject to less wear and can therefore remain unchanged in the fuel filter device over the entire service life of the fuel filter device, i.e. usually over several service lives of filter elements arranged therein. In particular, the maintenance outlay for such a fuel filter device can be considerably reduced thereby. In addition, an electric coalescer has less sensitivity to the composition of the fuel, other additives and water, without impairing separation performance. Furthermore, such a water separator in the form of an electric coalescer makes it possible to influence specific parameters of the separation process, in particular droplet movement.

In a further advantageous embodiment of the solution according to the invention, the electric coalescer integrated in the fuel filter device has a DC input voltage of 0-5000 V, a pulsed DC voltage of 0-5000 V with a frequency of 0-10,000 Hz or an AC input voltage of 0-40,000 V with a frequency of 0-10,000 Hz. The type of voltage with which the water separator according to the invention, i.e. the electric coalescer, is operated can therefore be selected freely, depending on the desired level of separation and the available voltage supply. For instance, pulsed direct current or alternating current is particularly suitable for water separation if there is a tendency for the water droplets to form chains in the case of large amounts of water.

In a further advantageous embodiment of the solution according to the invention, the electrodes of the electric coalescer are arranged in a filter housing, in the region of a heating device, on or in a water level sensor in/on a filter element and/or in a line. The electrodes can likewise also be divided between the inner wall of the filter housing and a part of the filter element, e.g. an inner or outer frame. Of course, it is also conceivable to arrange a plurality of electric coalescers in different locations of the fuel filter device. Just the above list shows how flexibly the water separator according to the invention, i.e. the electric coalescer, can be used in the region of the fuel filter. For instance, the electric coalescer can also be used in addition to a previously customary coalescer material to increase the separation rate. In this case the provision of a calming zone can be important, in which the water that has been separated out can collect and from which it can be drained if necessary.

In a further advantageous embodiment, the electric coalescer can be combined with a hydrophobic filter medium, which acts as a final separator for the water droplets and through which flow passes, for an increased separation rate.

A control device is expediently provided, by means of which the coalescer arranged in the fuel supply system or directly in the fuel filter device can be activated and/or can be regulated by means of a water content sensor, and by means of which in particular the separation rate of said coalescer can be set. The control device can also be used to influence the coalescence behaviour and/or coalescence efficiency of the electric coalescer, by for example individually controlling the frequency of the electric field. If, for example, an increased water fraction is measured, the water separation level can be increased by increasing the frequency. With increased output, the dwell time of the fuel-water emulsion in the region of the electric coalescer can likewise be comparatively short, so the desired water separation rates can be achieved by increasing the frequency. With pulsed direct current or alternating current, water separation can also be influenced using the pulsation rate.

The main factors influencing droplet coalescence in the electric field include, inter alia, the properties of the applied electric field, the design of the electrodes and of the electric coalescer, the substance-specific characteristics of the fluid phases and the prevailing flow conditions. The electric field can be applied in the form of a DC voltage, pulsed DC voltage or AC voltage field, or combinations thereof. The type of electric field that is most suitable is influenced mainly by the properties of the fluids and should be selected with reference to the particular application. The design of the electrodes includes the geometry thereof but in particular also the positioning thereof in the electric coalescer. The electrodes can for example be arranged as parallel plates or else as coaxial cylinders. A coaxial electrode arrangement has the advantage that the application of a voltage produces an inhomogeneous electric field that has a higher density of field lines in the region of the centre electrode. This produces a field strength gradient that accelerates the droplets in the direction of the region of higher field strength.

Further main factors influencing the coalescence efficiency are the droplet size distribution and the dispersed phase fraction, which describes the amount of dispersed phase. The droplet size distribution of the water in the fuel-water emulsion describes the droplet size and its proportional occurrence. When water is emulsified in fuel, two liquids that are soluble in each other to a limited extent are dispersed, i.e. the water (dispersed phase) is distributed in the fuel (continuous phase). However, a monodisperse system, in which all the droplets have the same diameter, is not produced. Rather, droplets of many different sizes occur, so the dispersed phase is present in a certain droplet size distribution. The droplet diameter in the dispersion is subject to the interaction of droplet breakup and coalescence, a continuous process of breaking up and coalescing droplets taking place until both phases are present separate from each other. However, the electric coalescer is used actively to coalesce smaller water droplets to form larger water droplets, and the separation process is therefore accelerated.

To influence the coalescing effect, the design of the electric coalescer can be optimised for the filter device in question. For instance, the exposure time of the electric field on the fuel can be changed by geometrical modifications. In addition, the energy per unit area introduced into the emulsion can be varied using the spacing of the electrodes, what is known as the annular gap size. A further design influence is the flow, which can be, inter alia, radial, vertical or else horizontal.

In addition to the geometry of the housing, the design, number and function of the electrodes can also be used to influence coalescence. The more individual electrodes are used, the more finely the influence on droplet agglomeration can be adjusted. The electric field can also be influenced depending on the configuration of the electrodes, e.g. by geometry modification or positioning. Suitable specific embodiments for the electrode of an electric coalescer are e.g. a helix structure, a rod shape, a plate shape or a half-shell-shaped structure. The shape of the electric field and thus the field gradient changes depending on the structure of the electrode.

An additional factor influencing coalescence is the composition of the medium to be treated, e.g. the water fraction present in the fuel. Further factors influencing electric coalescence are the general process parameters such as flow velocity, turbulence of the flow, exposure time of the electric field, temperature and pressure.

The influencing factors mentioned above influence the droplet-droplet interaction, the charge distribution on the droplet surface, the droplet deformation, the droplet movement in the electric field, the droplet size, the shear strength of the droplets, the collision rate of the droplets and thus the way in which the coalescence of the system works.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
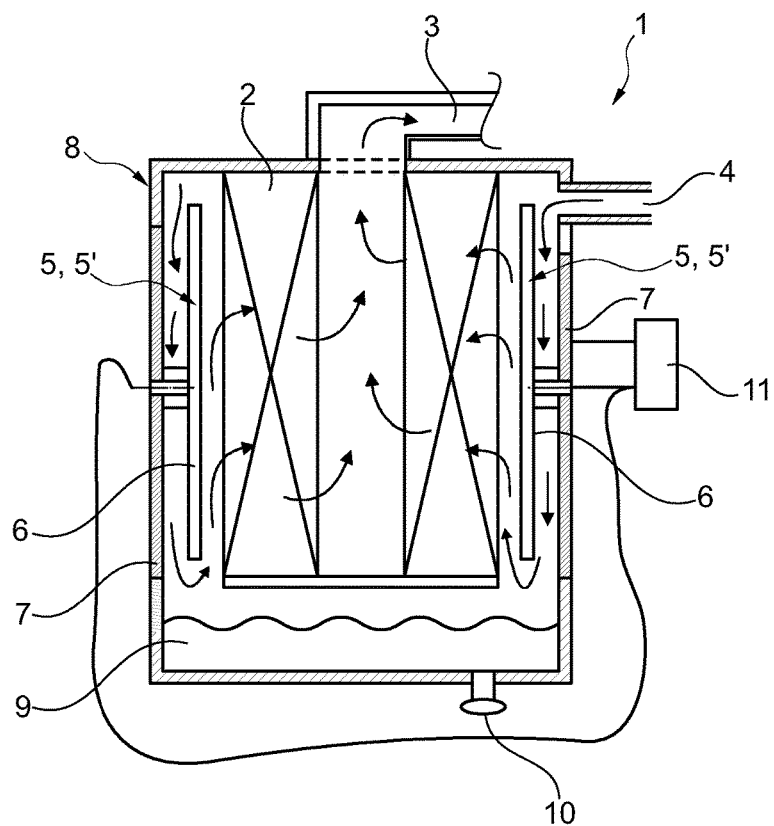
FIG. 1 schematically shows a fuel filter device according to the invention in a sectional diagram, FIG. 2 schematically shows a fuel supply system for an internal combustion engine.

According to FIG. 1, a fuel filter device 1 according to the invention has a customarily annular filter element 2, through which flow passes from the outside inwards in the present case. The interior, i.e. a clean side of the filter element 2, is fluidically connected to an outlet 3, whereas the outside of the filter element 2, i.e. the untreated side, is connected to a feed 4. A water separator 5 is likewise provided, which according to the invention is in the form of an electric coalescer 5'. The electric coalescer 5' can have two electrodes 6 and 7, which are insulated from the actual fuel, of which electrodes the electrode 7 is arranged inside a filter housing 8 as in the case shown. An individually adjustable water separation rate can then be achieved by supplying the electric coalescer 5' with current, the water separator 5 in the form of an electric coalescer 5' according to the invention also having the great advantage of not having to be replaced according to schedule, but being able to remain in the fuel filter device 1 over the entire service life of the fuel filter device 1, i.e. therefore also over several service lives of filter elements 2.

As can be seen in FIG. 1, some of the electric coalescer 5' is arranged in the filter housing 8, it of course also being conceivable for the electric coalescer to be arranged in the region of a heating device, in the region of a water level sensor, in/on the filter element 2 and/or in a line, for example the feed 4 or the outlet 3. In the present case, it is arranged partially in the filter housing 8 and partially in an annular space between said housing and the filter element 2. The water that coagulates in this region settles, owing to its greater density, in a water collection space 9 arranged at the bottom, from which the water can be drained according to schedule, for example by means of a water drainage screw 10.

According to the invention, a control device 11 is also provided, by means of which the water separator 5, i.e. the coalescer, can be activated and in particular the separation rate of the water separator can be set. The control device 11 can be used for example to set a field strength between the individual electrodes 6, 7 or else a frequency.

The water separator 5 according to the invention thus ensures effective and efficient separation of water out of the fuel to be filtered and guarantees consistently good separation values over the entire service life of the fuel filter device 1. It can be seen in FIG. 1 that the two electrodes 6 and 7 are of course arranged such that they are insulated from the fuel, so that the fuel does not come into direct contact with the electrodes 6, 7.

Figure 2:
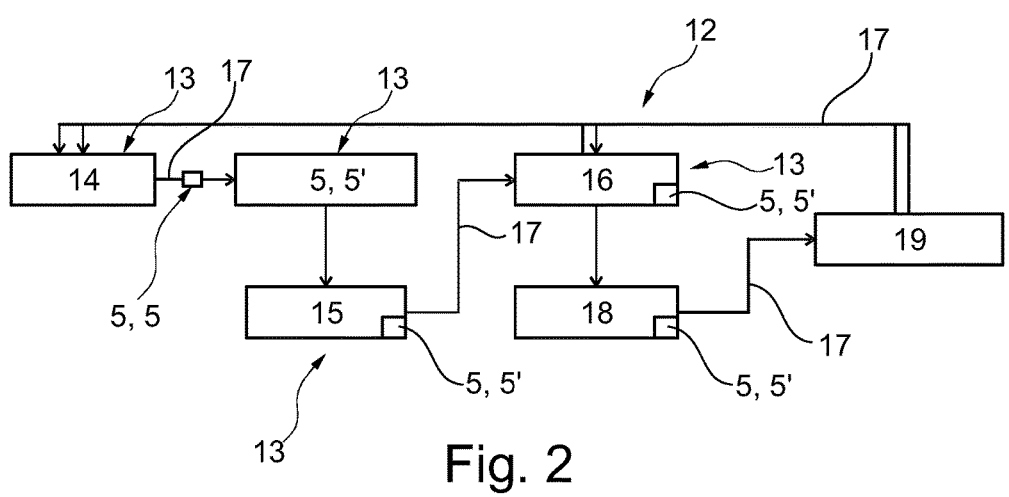

FIG. 2 shows a fuel supply system 12 according to the invention for an internal combustion engine 19, having a water separator 5 in the form of an electric coalescer 5' in order to separate a polar phase, in particular water, out of the fuel, which water separator is arranged on or in a component 13 of the fuel supply system 12. The component 13 can be in the form of a main tank 14, pre-filter 15, additional tank 16, fuel line 17 or main filter 18. Of course, the electric coalescer 5' can also be arranged as a separate water separator 5 at any point in the fuel supply system 12.

The invention claimed is:

1. A fuel filter device for a fuel supply system of an internal combustion engine, comprising:
    a water separator configured as an electric coalescer to separate a polar phase out of fuel; and
    a filter housing in which the electric coalescer is arranged; and
    a filter element arranged in the filter housing and configured to clean the fuel after water has been separated therefrom;
    wherein the electric coalescer has at least two electrodes that are insulated from the fuel.

2. The fuel filter device according to claim 1, wherein the electric coalescer has at least one of a DC input voltage of 0-5000 V, a pulsed DC voltage of 0-5000 V and an AC input voltage of 0-40,000 V.

3. The fuel filter device according to claim 2, wherein at least one of the pulsed DC voltage has a frequency of 0-10,000 Hz and the AC input voltage has a frequency of 0-10,000 Hz.

4. The fuel filter device according to claim 2, wherein the electric coalescer has the DC input voltage of 0-5000 V.

5. The fuel filter device according to claim 2, wherein the electric coalescer has the pulsed DC voltage of 0-5000 V.

6. The fuel filter device according to claim 2, wherein the electric coalescer has the AC input voltage of 0-5000 V.

7. The fuel filter device according to claim 1, wherein the electric coalescer is arranged in the filter housing, and wherein the electric coalescer is disposed at least one of in a region of a heating device, on a water level sensor, on the filter element and in a filter device line.

8. The fuel filter device according to claim 1, further comprising a control device configured to at least one of activate the electric coalescer and set a separation rate of the electric coalescer.

9. The fuel filter device according to claim 8, wherein the control device is configured to set at least one of the following parameters: an electric field, a field strength and a frequency.

10. The fuel filter device according to claim 1, wherein the polar phase is water.

11. A fuel supply system for an internal combustion engine, comprising:
    a water separator configured to separate a polar phase out of fuel, the water separator arranged in a filter housing; and
    a filter element arranged in the filter housing and configured to clean the fuel after the polar phase has been separated therefrom;
    wherein the water separator is configured as an electric coalescer, and wherein the electric coalescer has at least two electrodes that are insulated from the fuel.

12. The fuel supply system according to claim 11, further comprising at least one of a main tank, a pre-filter, an additional tank, a fuel line and a main filter.

13. The fuel supply system according to claim 11, wherein the electric coalescer has at least one of a DC input voltage of 0-5000 V, a pulsed DC voltage of 0-5000 V and an AC input voltage of 0-40,000 V.

14. The fuel supply system according to claim 13, wherein at least one of the pulsed DC voltage has a frequency of 0-10,000 Hz and the AC input voltage has a frequency of 0-10,000 Hz.

15. The fuel supply system according to claim 13, wherein the electric coalescer has the DC input voltage of 0-5000 V.

16. The fuel supply system according to claim 13, wherein the electric coalescer has the pulsed DC voltage of 0-5000 V.

17. The fuel supply system according to claim 13, wherein the electric coalescer has the AC input voltage of 0-5000 V.

18. The fuel supply system according to claim 11, further comprising a control device configured to at least one of activate the electric coalescer and set a separation rate of the electric coalescer.

19. The fuel supply system according to claim 18, wherein the control device is configured to set at least one of the following parameters: an electric field, a field strength and a frequency.

20. A fuel supply line for an internal combustion engine, comprising:

a filter housing;

a water separator configured to separate water from fuel; and a filter element arranged in the filter housing and configured to clean the fuel after the water has been separated therefrom;

wherein the water separator is arranged in a filter housing;

wherein the water separator is configured as an electric coalescer, the electric coalescer including at least two electrodes that are insulated from the fuel; and a control device in communication with the electric coalescer and configured to at least one of activate the electric coalescer and set a separation rate of the electric coalescer.

* * * * *